United States Patent [19]

Filtri

[11] Patent Number: 4,534,329

[45] Date of Patent: Aug. 13, 1985

[54] SUPPLY SYSTEM FOR SUPER CHARGED DIESEL ENGINES

[75] Inventor: Giorgio Filtri, Moncalieri, Italy

[73] Assignee: Fiat Auto S.p.A., Italy

[21] Appl. No.: 547,556

[22] Filed: Oct. 31, 1983

[30] Foreign Application Priority Data

Nov. 11, 1982 [IT] Italy ............................... 68322 A/82

[51] Int. Cl.³ .............................................. F02D 7/00
[52] U.S. Cl. ..................................... 123/383; 123/382
[58] Field of Search ............... 123/383, 382, 380, 379, 123/387, 341

[56] References Cited

U.S. PATENT DOCUMENTS

| | | | |
|---|---|---|---|
| 2,667,153 | 1/1954 | Bensinger | 123/382 |
| 2,891,533 | 6/1959 | Clegg | 123/382 |
| 2,924,208 | 2/1960 | Grozinger et al. | 123/382 |
| 3,750,636 | 8/1973 | Okura | 123/382 |
| 4,157,701 | 6/1979 | Holtrop et al. | 123/383 |

FOREIGN PATENT DOCUMENTS

| | | | |
|---|---|---|---|
| 041429 | 4/1981 | Japan | 123/383 |
| 188730 | 11/1982 | Japan | 123/502 |
| 2079364 | 1/1981 | United Kingdom | 123/383 |

Primary Examiner—Magdalen Y. C. Moy
Attorney, Agent, or Firm—Andrus, Sceales, Starke & Sawall

[57] ABSTRACT

A supply system for supercharged diesel engines which has the purpose of obtaining high power for short periods of time without making it necessary to introduce changes to the engine, but simply by adding to a normal supercharging circuit a predetermined threshold on the fuel delivery regulator, a control operated by an electrically operated valve and controlled by the accelerator.

2 Claims, 2 Drawing Figures

SUPPLY SYSTEM FOR SUPER CHARGED DIESEL ENGINES

BACKGROUND OF THE INVENTION

The present invention relates to a supply system for supercharged diesel engines, which system permits high power to be achieved for short periods of time.

One of the most important objectives of current motor vehicle technology is the reduction of consumption, both by reducing the weight of motor vehicles, by optimising the efficiency of the power units and, not least, by raising the transmission ratios.

This latter type of system, which gives excellent results from the point of view of fuel saving, involves on the other hand a significant loss of acceleration and this considerably detracts from the overall performance of the motor vehicle. At a particular disadvantage are vehicles equipped with diesel engines which, even if provided with supercharging, have a power sometimes equal but often less than the same models equipped with petrol engines, and with a greater overall weight.

SUMMARY OF THE INVENTION

The object of the present invention is to obtain a supply system for super-charged diesel engines which permits high power to be obtained for predetermined short periods of time for the purpose of increasing or at least maintaining unaltered, the qualities of acceleration and pickup of a motor vehicle having a high transmission ratio which is therefore favourable from the point of view of fuel consumption.

The said object is achieved by means of a supply system for supercharged diesel engines comprising:

a turbo compressor driven by exhaust gas from the engine;

a fuel delivery regulator connected to the injection pump and controlled by the pressure in the induction manifold, characterised by the fact that;

the fuel delivery regulator is provided with a device operable to significantly increase the delivery of fuel by the injection pump;

the accelerator pedal is coupled to a control operating the device with which the delivery regulator is provided in dependence on a predetermined position of the pedal itself.

BRIEF DESCRIPTION OF THE DRAWINGS

Further characteristics and advantages will become clearly apparent from the following description with reference to the attached drawings, provided by way of non limitative example, and in which.

DETAILED DESCRIPTION OF THE INVENTION

Figure 1:
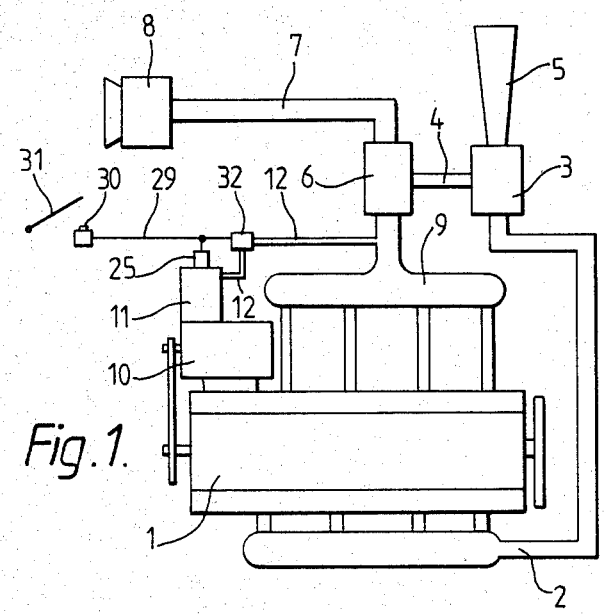
FIG. 1 is a schematic view of an engine having a system according to the invention.

With reference to the drawings, a diesel engine is generally indicated with the reference numeral 1, which engine can be either of the direct injection or indirect injection type and is provided with an exhaust manifold 2 which penetrates into the turbine 3 of a turbo compressor 4 provided with an exhaust 5 and connected to a compressor 6 which receives air through a duct 7 coming from the air filter 8. The compressor 6 delivers compressed air to an induction manifold 9.

An injection pump 10 connected to the engine is provided with a fuel delivery adaptation device 11 operating in dependence on the pressure in the induction manifold. This pressure is detected via a duct 12 connected to the manifold 9.

Figure 2:
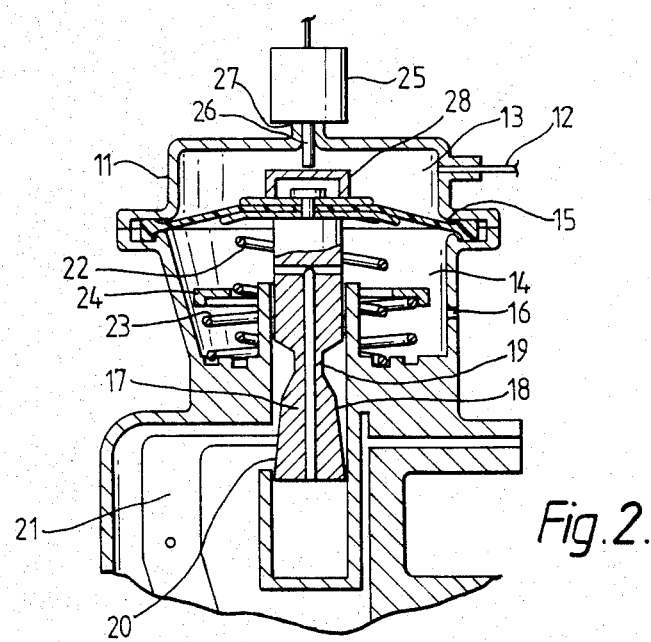
FIG. 2 is a partially sectioned view of the device illustrated in FIG. 1.

Details of the devive 11 which senses the supercharging power in the manifold are illustrated in FIG. 2. This device is formed by two superimposed chambers 13 and 14 which are separated by a resilient membrane 15. The upper of the two chambers is connected to the induction manifold by the duct 12 which has already been mentioned, whilst the lower chamber is open to the atmosphere through a hole 16. To the membrane 15 is connected, in a known way, a downwardly facing piston 17 sliding in a seat 18 and the profile of which has, in its median part, a groove 19 which joins with a frusto-conical part 20. A probe finger 21 is held in contact with the side of the piston by known means not illustrated.

A spring 22, co-axial with the piston, maintains the membrane 15 pressed upwardly with a predetermined thrust, whilst a second spring 23, shorter than the preceding one and also having a predetermined load, is positioned coaxially with the first, is provided with a cap 24 over its upper part and also rests, like the spring 22, on the lower wall of the chamber 14. On the upper wall of the fuel delivery regulator 11 there is located, in a central position, an electrically operated valve 25 actuating a piston 26 which, by passing through a hole 27 extends into the interior of the chamber 13 and is able to act on an end cap 28 connected to the membrane 15 and therefore to the piston 17 in such a way as to press the piston itself downwardly against the action of the springs 22 and 23.

The electrically operated valve 25 is controlled by means of a connection 29 from a control unit 30 which is operated when the accelerator 31 reaches a predetermined open position, which will generally be very close to its maximum or lower limit.

Operation of the device.

When the accelerator 31 has not passed the predetermined open position in its range of open positions between upper and lower limits, the operation of the device corresponds entirely and exactly to that of a normal supercharging system and will not be described since it is well known and in the capacity of any man skilled in the art.

However, when the accelerator 31 reaches the predetermined open position the device behaves in the manner described below.

The control unit 30 operates the electrically operated valve 25 for a short moment to displace the piston 26 which presses both the membrane 15 and the piston 20 downwardly via the end cap 28. The length of the piston 26 is calculated in such a way that the piston 20 is pressed downwardly sufficiently far for the probe finger 21 which slides on the side of the piston 20 to become located at the beginning of the slope of the groove 19. For this the piston 26 must exert a thrust such as to permit it to overcome the resistance exerted by the spring 23 on the membrane 15. The spring 23 in fact constitutes, via the end cap 24, a threshold which in normal operating conditions is not ever exceeded by in membrane and therefore always constitutes the end point of the stroke of the piston in normal operating conditions.

In these conditions the supercharging pressure in the induction manifold reaches very high values and/or in any case greater than those existing in the normal range of use of the engine in that the greater delivery of fuel effected by the pump as a consequence of the fact that the probe finger is located in the groove 19 causes an almost instantaneous increase in the temperature and pressure of the exhaust gases and therefore a greater capacity of the turbo compressor.

The high supercharging value is detected by the device 11 via the duct 12. Consequently, the membrane 15 will receive a strong downward thrust which will hold the membrane in the position reached by the action of the piston 26. In this way there will be a sudden high increase in the power provided by the engine.

In order not to shorten the life of the engine, these high powers will only be able to be used for short instants and this is easily obtainable for example by positioning in series on the duct 12 a three way-two position electrically operated valve 32 controlled simultaneously by the electrically operated valve 25 and provided with a predetermined delay time, which interrupts for several instants the connection between the induction manifold 9 and the chamber 13, connecting this latter to the atmosphere. In this way there will be obtained a sudden reduction in the pressure in the chamber 13 and the spring 23, returning to its extended position, will raise the piston making the finger probe move out from the groove and returning the fuel delivery to normal values.

It is intended that what is described above can be widely varied without by thus departing from the scope of the invention.

I claim:

1. A fuel supply system for a supercharged diesel engine, comprising, in combination:
    (a) a turbo compressor (14) operated by exhaust gas from the engine,
    (b) an induction manifold (9) connected between said turbo compressor and the engine,
    (c) an injection pump (10) connected to the engine,
    (d) a fuel delivery regulator (11) connected to said pump and to said manifold and with said regulator being responsive to pressure in said manifold,
    (e) control means (25) for said regulator and with said control means being actuatable to significantly increase the delivery of fuel to the engine by said pump,
    (f) an accelerator pedal (31) movable through an open range of positions between upper and lower limits,
    (g) a controller (30) connected to said control means (25) and responsive to passing of said accelerator pedal (31) downwardly past a predetermined position in said open range of positions to thereby actuate said control means (25),
    (h) said predetermined position of said accelerator pedal (31) being closely adjacent said lower limit,
    (i) and a three-way two-position electrically operated time delay valve (32) disposed in the connection between said induction manifold (9) and said fuel delivery regulator (11),
    (j) said valve (32) providing means actuatable to temporarily interrupt the said connection between said manifold and said regulator and to simultaneously connect said regulator (11) to atmosphere.

2. The fuel supply system of claim 1 in which said control means (25), when actuated by said controller (30), forms means to simultaneously actuate said time delay valve (32).

* * * * *